United States Patent

[11] 3,627,627

[72] Inventors Albert Nobell;
Thomas S. Armstrong, both of Coloma, Calif.
[21] Appl. No. 14,780
[22] Filed Feb. 27, 1970
[45] Patented Dec. 14, 1971
[73] Assignee Chevron Research Company
San Francisco, Calif.
Continuation of application Ser. No. 646,165, June 15, 1967, now abandoned. This application Feb. 27, 1970, Ser. No. 14,780

[54] NOVEL ADHESIVE COMPOSITIONS
10 Claims, No Drawings

[52] U.S. Cl. .................................................... 161/209,
156/335, 161/262, 260/29.3, 260/38
[51] Int. Cl. ................................................... C08g 51/24
[50] Field of Search ........................................ 260/29.3,
38; 161/209, 262; 156/335

[56] References Cited
UNITED STATES PATENTS

| | | | |
|---|---|---|---|
| 2,546,624 | 3/1951 | Adams ........................ | 260/29.3 |
| 2,612,481 | 9/1952 | Cone ........................... | 260/29.3 |
| 2,988,525 | 6/1961 | Clem ........................... | 260/29.3 |
| 3,010,919 | 11/1961 | Mackinney et al. ......... | 260/38 |
| 3,041,301 | 6/1962 | Armour ....................... | 260/29.3 |
| 3,238,158 | 3/1966 | Conca et al. ................ | 260/29.3 |
| 3,243,397 | 3/1966 | Herkimer et al. ........... | 260/29.3 |
| 3,321,358 | 5/1967 | Campbell et al. ........... | 260/29.3 |

FOREIGN PATENTS

| | | | |
|---|---|---|---|
| 231,242 | 3/1925 | Great Britain ............... | 260/29.3 |
| 689,002 | 6/1964 | Canada ........................ | 260/29.3 |

*Primary Examiner*—John C. Bleutge
*Attorneys*—A. L. Snow, F. E. Johnston, G. F. Magdeburger and D. L. Hagmann

ABSTRACT: Novel adhesive compositions are obtained by the addition of adsorbent clay and a lower organic dicarboxylic acid to aqueous lower methylol phenol solutions. The resulting mixtures are especially adapted for making boil-resistant exterior grade hot-pressed plywood.

NOVEL ADHESIVE COMPOSITIONS

This application is a continuation of Ser. No. 646,165, filed June 15, 1967, now abandoned.

BACKGROUND OF THE INVENTION

This invention relates to an adhesive composition especially adapted for making boil-resistant exterior grade hot-pressed plywood. More particularly, it relates to modified aqueous lower methylol phenol solutions and a method for their use in the bonding of water wettable solids, especially wood.

It is known in the art to employ phenolic resins as adhesives for the bonding of wood plies, wood flour, cellulosic materials and the like. In this use, the practice has been to polymerize aqueous phenol-aldehyde mixtures by the application of heat in a reaction which is continued until a relatively high molecular weight resin is produced. The resin is then applied to a wood surface, for example, wood veneer, and a multiply sandwich of the veneer is pressed together in a suitable press while applying heat and pressure, thereby producing an integrated well-bonded unit.

A problem incidental to the foregoing arises in view of the high temperature required for imparting the desired stable bonding. This temperature is substantially above the boiling point of water. Only a limited amount of water vapor can be tolerated during the press operation. Otherwise the resulting plywood bonding is defective. Consequently, in conventional practice, the wood veneer is kiln dried to remove most of the water content beforehand. Kiln drying, especially to very low water contents, is time consuming and an added cost factor.

Another problem incidental to high-temperature bonding of wood is the tendency to produce discoloration effects at the glue line and/or on the wood surfaces.

It has now been found that aqueous solutions of lower methylol phenols are useful adhesives for the thermal bonding of water wettable solids when suitably modified as by the addition of inert adsorbent clay. Thus a mixture comprising at least 10 parts of methylol phenol, from 30 to 80 parts water, and from 10 to 60 parts of adsorbent clay per 100 parts of final mixture is an excellent adhesive for use as noted above. Preferably a minor amount of a second inorganic solid, an inert clay substantially in the form of flat, platelike crystals, is added and functions as a blocking agent. The foregoing mixtures have reasonably long shelf lives.

To the above mixture before use is added a catalytic amount of a relatively strongly acidic lower organic dicarboxylic acid. A minor amount of the mixture is applied as a coating to the desired surfaces, heat is applied, e.g., 200°-330° F., for a short period, i.e., sufficient to initiate polymerization of the lower methylol phenols in the mixture, and shortly thereafter the bonding is complete. Methylol phenols are thus polymerized in situ during the thermal bonding in the present process and produce highly satisfactory adhesion. This is accomplished at substantially lower press temperatures than ordinarily required, and no additional press time is needed.

Surprisingly the present adhesive mixtures require less time to produce a satisfactory bond than is required for comparable conventional phenolic glues at given operable press temperatures. Moreover, the present adhesives yield satisfactory bondings at lower temperatures where these conventional adhesives are not satisfactory bonding agents. Lower press temperatures mean a higher operational water tolerance and hence reduced kiln drying times in the prepress conditioning of the plywood sheeting.

By lower methylol phenols is meant by definition the compounds of the formula $HOC_6H_{5-n}(CH_2OH)_n$ in which $n$ is a number in the range 1 to 3, inclusive, and mixtures thereof.

By a lower organic relatively strongly acidic dicarboxylic acid is meant by definition those acids containing less than five carbon atoms per molecule and only carbon, hydrogen and oxygen and having an ionization constant for the first hydrogen of at least about $10^{-3}$.

By an inert adsorbent clay is meant by definition powdered, essentially water-insoluble natural or synthetic metal and mixed metal silicates having an affinity for water and a thickening effect upon aqueous solutions, for example, attapulgite, montmorillonite, zeolite and the like clay and claylike minerals having relatively open crystal lattices and average particle sizing in general below about 100 microns. Inertness in the usual chemical sense is intended.

In a preferred embodiment of the instant invention, the lower methylol phenols are prepared by the reaction of phenol with formaldehyde. Sufficient phenol is dissolved in formalin to yield a 1 to 1.5 mol ratio, respectively. Based upon the phenol, sufficient calcium oxide is added to yield a mol ratio of 0.5 to 0.01, respectively. The mixture is heated at a temperature in the range 40°-60° C. until substantially all of the formaldehyde has reacted but little or none of the methylol phenol has polymerized, e.g., until the distinctive odor of formaldehyde disappears or when the viscosity of the solution has increased to a value in the range 10-40 centipoises.

To the aqueous solution of methylol phenols as prepared above is added sufficient adsorbent-type attapulgite clay, i.e., ignited for drying and inactivation, pulverized and screened to average sizing below about 100 micron diameter, to increase the viscosity of the resulting mixture to a value in the range from about 300 to 10,000 centipoises. For this purpose from about 10 to 60 parts of the clay per 100 parts of final mixture is used, depending upon the particular adsorbent clay employed. Mixing should be thorough.

In addition to the foregoing and in this preferred mode where the adhesive is used for the bonding of a porous solid such as plywood veneer, a minor amount (from about 5 to 30 parts per 100 parts of final mixture) of a suitable inorganic blocking agent, such as aluminum silicate, is added, as a matter of economy, to inhibit possible flow of the adhesive away from the primary bonding surface.

A second optional but preferred additive is a minor amount of a tackifier such as polyvinyl acetate of polyvinyl alcohol. From about 0.5 to 10 weight percent, based upon final mixture, of the tackifier is useful for adapting the present adhesive for use in conventional plywood presses. That is to say, the additive is desirable to accommodate the present adhesive to commercial plywood presses adapted for use of prior art high molecular weight phenolic resins.

The adhesive prepared as above has a long shelf life, 1-2 months and longer. It requires the addition of a catalytic amount of a lower organic dicarboxylic acid prior to use in a bonding operation. The acid, preferably oxalic, is needed to catalyze the in situ polymerization of the methylol phenol. Enough is added (about 5 weight percent of final mix) to lower the pH of the adhesive mixture to a pH value in the range 1.0-2.0. The acidified mixture has a reasonably long pot life, i.e., 1-2 days, and is particularly suitable for use in the production of multiveneer plywood.

Lower methylol phenols in general can be used for the preparation of the present adhesives. These polyalcohols per se are relatively difficult to isolate and purify. Conveniently, they are prepared by the strong base catalyzed reaction of aqueous formaldehyde with phenol and used without purification. In addition to the calcium oxide of the preferred embodiment as described above, other suitable strong bases for use herein are sodium, potassium, lithium, calcium, magnesium, barium and the like hydroxides, e.g., strong mineral bases.

For satisfactory use in the present invention, the methylol phenols should be relatively free of strong base. Therefore the use of only a minor amount of these bases is permissible in the above-described in situ preparation of the methylol phenols. Based upon the phenol charged, less than about 0.5 mol of base per mol of phenol should be employed. On the other hand, for satisfactory reaction rates at least about 0.01 mol of base per mol of phenol is required. The preferred range is 0.08-0.01 to 1, respectively.

The methylol phenols as defined above are in general suitable for use herein. Preferably in the in situ preparation of the polyalcohol as above, the mol ratio of formaldehyde to phenol employed is in the range 1-2.5 to 1, respectively.

For satisfactory adhesive properties, strength of bond resistance to weathering and the like, the adhesive mixture should contain at least 10 weight percent of the lower methylol phenols. For practical reasons, cost, relative efficiency and the like, the amount of methylol phenols should not exceed about 50 weight percent. On the other hand, the presence of at least 30 weight percent of water in the adhesive is desirable as a carrier to facilitate application of the adhesive to the surfaces to be bonded.

Inorganic inert water-insoluble metal and mixed metal silicates in general are useful in the preparation of the subject adhesive compositions. The porous adsorbent crystalline clays having needlelike shapes are preferred. This configuration appears to contribute additional strength to the resulting adhesive bond, as well as other desirable attributes. Magnesium-aluminum silicates and processed commercial attapulgite-type clays are representative useful clays.

The amount of the adsorbent clay used in the adhesive mixture varies depending upon the particular clay, its relative water adsorbance and thickening effect upon the final mixture. Ordinarily at least about 10 weight percent is required, and at the most in view of other requirements as noted above no more than about 60 weight percent of clay is desirably present in the final mix.

The following examples further illustrate the invention.

Methylol Phenol Preparation

Example 1

Into a 5-gallon reaction vessel fitted for stirring, temperature control and reflux was charged 2.19 kilograms (23.3 mols) of phenol, an equal weight of 50 percent formalin (35 mols of formaldehyde) and 52.2 g. of calcium oxide (0.9 mol). The reaction mixture was maintained at about 50° C. for a period of 3½ hours at which time the odor of formaldehyde in the overhead vapors was no longer detectable. At ambient temperature (ca. 22° C.) the reaction product mixture had a viscosity of 30–40 centiposes. Separate aliquots of this product were tested for storage characteristics as follows:

| Aliquot | I | II |
|---|---|---|
| Time, days | 30 | 20 |
| Temperature, °F. | ambient | ~93 |
| Viscosity, cp. | 50–60 | 80 |

These data demonstrate that lower methylol phenols have satisfactory storage characteristics.

Example 2

Solid paraformaldehyde was dissolved in phenol in substantially the same mol ratio of phenol to formaldehyde, e.g., solid paraformaldehyde calculated as free formaldehyde as in the above example. Sufficient calcium oxide to yield a base to phenol ratio of about 0.04 to 1, respectively, was added. Except for an initially strong exotherm as from the heat of reaction, the production of methylol phenols paralleled that of example 1. So long as the temperature of the reaction mixture is kept below about 55° C., no appreciable amount of undesirable polymerization of the methylol phenols occurs, and upon the addition of the desired amount of water, the resulting product is comparable in all essential details to the reaction product obtained by the use of an aqueous reaction medium where formalin is the source of formaldehyde.

The foregoing example demonstrates that the desired lower methylol phenols can also be prepared in a nonaqueous medium. Normally, formalin is less costly than solid paraformaldehyde or other solid forms of formaldehyde and for this reason is preferred.

Example 3

To a 35.4 g. aliquot of the aqueous (≈25 weight percent water) methylol phenols prepared in example 1 was added 10 g. of attapulgite clay, 14 g. of aluminum silicate and 3 g. of polyvinyl acetate (tackifier). The resulting composition was mixed thoroughly. It had an excellent shelf life, showing no substantial change over a 1–2 month period under ambient conditions, and was suitable for use in conventional plywood production presses.

The clay employed in the above formulation was a dried and ground high surface attapulgus adsorbent clay which had been reduced to substantially colloidal (micronization) dimensions, e.g., 0.1 to 1 micron equivalent diameter, and had a needlelike crystalline configuration. It tested neutral to alkaline when wet with water.

The aluminum silicate employed in the above formulation was also a dried, ground natural clay. It had, however, a flat platelike hexagonal configuration and served as a blocking agent, e.g., for conservation of adhesive, to minimize flow of the glue into the pores of the material being bonded. This silicate was mainly of the 1–50 micron average diameter range.

Example 4

To the mixture prepared as in example 3 was added a 50 weight percent solution of oxalic acid in water in an amount sufficient to lower the pH of the mixture to about 1, e.g., 10–16 g. of solution. The resulting acidified adhesive mixture was applied to typical Douglas Fir veneer for a 3-ply test sample, i.e., 12×12×⅛ inches, and was found to produce an excellent bond when hot pressed.

The resulting adhesive or glue mix has numerous advantages. It readily wets the conventional metal doctor or glue spreading rolls. It has a reasonably good pot life in that solids precipitation, polymerization, and similar undesirable prespread characteristics, which limits the useful glue mix storage life, do not take place until after a period of from 1 to 2 days in general. Hence pot life is not a critical factor for the present adhesives.

Example 5

As in example 4 a mixture was prepared except that an organic additive, e.g., wheat flour, was substituted for the inorganic clay. The resulting mixture would not wet the adhesive spreader doctor rolls, and hence the adhesive could not be applied in a useful manner to the plywood veneer. Other comparable organics gave essentially the same unsatisfactory result, including, in addition, undesirable phase separations to some degree in the mix.

Example 6

As in example 3, an adhesive mixture was prepared except that powdered (micronized) bentonite clay was substituted for the attapulgus clay. The resulting adhesive readily wet the doctor rolls and could be used to yield satisfactory plywood.

Example 7

Plywood adhesive was prepared as in example 4 and applied to standard 12×12×⅛ inches Douglas Fir plywood veneer. In the table following is listed the conditions of bonding and preparation of plywood test panels in a standard plywood press and the results obtained from the evaluation of the plywood thus produced. The test applied was the Commercial Standard CS 45–60 test as described in American Plywood Association's publication dated Aug. 25, 1965, and titled "Commercial Standard For Softwood Plywood and Consolidation of CS 45–60, CS 122–60, and CS 259–63."

TABLE.—SHEAR TESTS OF PRESENT AND COMMERCIAL PLYWOODS

| Sample | 1 | 2 | 3 | 4 | 5 | 6 | 7 | 8 | 9 | 10 | Commercial ⅜" exterior 3-ply |
|---|---|---|---|---|---|---|---|---|---|---|---|
| Property: | | | | | | | | | | | |
| Glue spread, g./ft.² | ¹ 34.4 | ¹ 30.5 | 30.1 | 29.0 | 33.5 | 33.5 | 31.0 | 32.8 | 32.0 | 34.5 | |
| Assembly time, min. | 8 | 8 | 8 | 8 | 18 | 8 | 3 | 8 | 8 | 8 | |
| Press time, min. | 4 | 4 | 4 | 4 | 4 | 3½ | 4 | 4 | 4 | 3 | |
| Press temperature, °F. | 212 | 225 | 247–248 | 248 | 255 | 245 | 245 | 285 | 285 | 285 | |

TABLE.—SHEAR TESTS OF PRESENT AND COMMERCIAL PLYWOODS

| Sample | 1 | 2 | 3 | 4 | 5 | 6 | 7 | 8 | 9 | 10 | Commercial 3/8" exterior 3-ply |
|---|---|---|---|---|---|---|---|---|---|---|---|
| Tests at 0.05 in./min.: | | | | | | | | | | | |
| Tested dry at age, days | 10 | 3 | 2 | 14 | 2 | 2 | 2 | 2 | 14 | 2 | |
| Bond strength, p.s.i.: | | | | | | | | | | | |
| Average | 415 | 260 | 300 | 350 | ² 195 | ² 215 | 250 | 250 | 245 | 285 | 140 |
| Range | 320–475 | 195–300 | 245–355 | 290–415 | 140–230 | 150–255 | 165–295 | 185–295 | 190–270 | 275–305 | 105–170 |
| Wood failure, percent: | | | | | | | | | | | |
| Average | 95 | 95 | 100 | 100 | ² 95 | 100 | 100 | 100 | 100 | 100 | 98 |
| Range | 90–100 | 85–100 | | | 80–100 | 80–100 | | | | | 90–100 |
| Boiled ³ at age, days | 10 | 10 | 6 | 14 | 6 | 6 | 6 | 6 | 14 | 6 | |
| Bond strength, p.s.i.: | | | | | | | | | | | |
| Average | 0 | 140 | 205 | 245 | ⁴ 155 | 140 | 210 | ⁴ 185 | 225 | 195 | 155 |
| Range | | ² 120–185 | 165–275 | 205–280 | 115–185 | 100–170 | 170–240 | 160–205 | 180–270 | 140–235 | 130–223 |
| Wood failure, percent: | | | | | | | | | | | |
| Average | 0 | ² 95 | 100 | 100 | ⁴ 100 | 95 | 100 | ⁴ 100 | 100 | 100 | 100 |
| Range | | 90–100 | | | | 80–100 | | | | | |

¹ Samples from these two panels were combined and randomized for initial testing. After observing delamination of most of the boiled samples, these results were thrown out and the panels were tested individually
² Averages of three determinations.
³ Boiled in water 4 hours, dried in air at 145° C. for 20 hours boiled again 4 hours, cooled in water, and tested wet per CS 45–60 and proposed revision of November 1965.
⁴ Averages of four determinations. All other values are averages of five tests.

Example 8

To be satisfactory, an adhesive must also permit a reasonable assembly time for the coated veneer without drying out. As in example 4, the adhesive was prepared and applied to Douglas Fir veneer. Assembly times were varied to give the following periods: 2, 8, 13 and 18 minutes. The panels were subjected to a 4-minute press time at 240° F. and tested. The wood failure in all cases was excellent, e.g., above 90 percent. (Note: Wood failure means that the glue line is stronger than the bonded wood per se.)

The foregoing results demonstrate that the novel adhesive of the instant invention is an excellent bonding agent. Even at a press temperature as low as 212° F., Run No. 1, after 4 minutes resulted in a fair bond. Given a few minutes more in the press, it is estimated that even at a temperature as low as 212° or even 200° F., a bond sufficiently strong to pass the boil test will result. In all other test samples in the above runs, the bonding was as good as or better than commercially acceptable plywood.

It will be obvious to those skilled in the art that the subject adhesives and methods are in general useful for bonding water wettable solids, as well as many other variations made obvious in view of the instant disclosure and examples.

We claim:

1. The method of preparing an adhesive for use in the thermal-induced bonding of water wettable solids coated therewith, which comprises mixing a lower methylol phenol, powdered substantially anhydrous adsorbent clay, a crystalline aluminum silicate having an average particle sizing below about 100 microns and a platelike structure, water and a lower organic dicarboxylic acid, said mixing being effected at a temperature in the range from about 0° to about 80° C., wherein the resulting mixture contains for each 100 parts thereof from about 10 to 50 parts of the methylol phenol, from about 30 to 80 parts of water, from about 10 to 60 parts of said clay, from 1 to 10 parts of said crystalline silicate and an amount of said organic acid in the range from about 1 to 5 parts and sufficient to adjusted the pH of the resulting mixture to a value in the range from about 1 to 2, said clay being a water insoluble natural or synthetic metal and mixed metal silicate having an affinity for water and an average particle sizing below about 100 microns, and said phenol being of the formula $HOC_6H_{5-n}(CH_2OH)_n$, wherein $n$ is a number in the range 1 to 3, inclusive.

2. The method as in claim 1 wherein the addition of said acid is the last to be effected in said preparation.

3. The method as in claim 1 wherein said lower methylol phenol is prepared by the strong mineral base catalyzed reaction of phenol with formaldehyde by heating a mixture of said reactants at a temperature in the range from about 20° to 55° C. wherein for each mol of phenol from about 0.01 to 0.5 mol of said base and from about 1 to 2.5 mols of formaldehyde is used, said heating being discontinued when the formaldehyde has all reacted.

4. The composition which for each 100 parts thereof consists essentially of from about 10 to 50 parts of a lower methylol phenol, from about 30 to 80 parts of water, from about 1 to 10 parts of a crystalline aluminum silicate having an average particle sizing below about 100 microns and a platelike structure, and from about 10 to 60 parts of a powdered substantially anhydrous adsorbent clay, said clay being a water-insoluble natural or synthetic metal and mixed metal silicate having an affinity for water and an average particle sizing below about 100 microns, said phenol being of the formula $HOC_6H_{5-n}(CH_2OH)_n$, wherein $n$ is a number in the range 1 to 3, inclusive.

5. The composition as in claim 4 which also contains from about 1 to 10 parts of oxalic acid.

6. The composition which for each 100 parts thereof consists essentially of from about 10 to 50 parts of a lower methylol phenol from about 30 to 80 parts of water from about 1 to 10 parts of a crystalline aluminum silicate having an average particle sizing below about 100 microns and a platelike structure, and from about 10 to 60 parts of a powdered substantially anhydrous adsorbent clay selected from the group consisting of attapulgite, montmorillonite and bentonite, said clay having an average particle sizing below about 100 microns, and said phenol being of the formula $HOC_6H_{5-n}(CH_2OH)_n$, wherein $n$ is a number in the range 1 to 3, inclusive.

7. In the method of preparing plywood by coating wood veneer with an adhesive bonding agent, assembling said coated veneer and applying heat and pressure as in a plywood press, the improvement which comprises employing as the adhesive a mixture in parts by weight containing 100 parts of a component A and an amount of a component B in the range from about 1 to 5 parts, said A component containing for each 100 parts thereof from about 10 to 50 parts of a methylol phenol of the formula $HOC_6H_{5-n}(CH_2OH)_n$, wherein $n$ is a number in the range 1 to 3, inclusive, from about 30 to 80 parts water from about 1 to 10 parts of a crystalline aluminum silicate having an average particle sizing below about 100 microns and a platelike structure, and from about 10 to 60 parts of a powdered substantially anhydrous adsorbent clay, said clay being a water-insoluble natural or synthetic metal and mixed metal silicate having an affinity for water and an average particle sizing below about 100 microns, said component B being an organic dicarboxylic acid containing less than five carbon atoms and having an ionization constant for the first hydrogen of at least about $10^{-3}$, the amount of the acid added being sufficient to adjust the pH of the resulting mixture to a value in the range from about 1 to 2.

8. The composition as in claim 4 further characterized in that to the mixture is added an organic dicarboxylic acid in an amount in the range from about 1 to 5 parts by weight and sufficient to adjust the pH of the resulting mixture to a value in the range from about 1 to 2, said acid containing less than five carbon atoms and having an ionization constant for the first hydrogen of at least about $10^{-3}$.

9. The composition as in claim 6 further characterized in that to the mixture is added an organic dicarboxylic acid in an amount in the range from about 1 to 5 parts by weight and sufficient to adjust the pH of the resulting mixture to a value in the range from about 1 to 2, said acid containing less than five carbon atoms and having an ionization constant for the first hydrogen of at least about $10^{-3}$.

10. The plywood composition obtained by coating wood veneer with an adhesive bonding agent, assembling said coated veneer and applying heat and pressure as in a plywood press, wherein said adhesive consists essentially of a mixture in parts by weight containing 100 parts of a component A and an amount of a component B in the range from about 1 to 5 parts, said A component containing for each 100 parts thereof from about 10 to 50 parts of a methylol phenol of the formula $HOC_6H_{5-n}(CH_2OH)_n$, wherein $n$ is a number in the range 1 to 3, inclusive, from about 30 to 80 parts water from about 1 to 10 parts of a crystalline aluminum silicate having an average particle sizing below about 100 microns and a platelike structure, and from about 10 to 60 parts of a powdered substantially anhydrous adsorbent clay, said clay being a water-insoluble natural or synthetic metal and mixed metal silicate having an affinity for water and an average particle sizing below about 100 microns, said component B being an organic dicarboxylic acid containing less than five carbon atoms and having an ionization constant for the first hydrogen of at least about $10^{-3}$, the amount of the acid added being sufficient to adjust the pH of the resulting mixture to a value in the range from about 1 to 2.

* * * * *